United States Patent
Shirai

[19]

[11] Patent Number: 5,828,956
[45] Date of Patent: Oct. 27, 1998

[54] PROGRAMMABLE CELLULAR TELEPHONE AND SYSTEM

[75] Inventor: Kazuhiko Shirai, San Diego, Calif.

[73] Assignee: Sony Electronics, Inc., Park Ridge, N.J.

[21] Appl. No.: 474,164

[22] Filed: Jun. 7, 1995

Related U.S. Application Data

[63] Continuation-in-part of Ser. No. 366,502, Dec. 30, 1994.

[51] Int. Cl.$^6$ .................................................. H04M 11/00
[52] U.S. Cl. ........................................... 455/411; 455/418
[58] Field of Search .................................. 379/62, 59, 58, 379/61; 340/825.34; 455/54.2, 411, 410, 418, 551, 565

[56] References Cited

U.S. PATENT DOCUMENTS

| | | | |
|---|---|---|---|
| 4,864,599 | 9/1989 | Saegusa et al. .......................... | 455/463 |
| 4,958,368 | 9/1990 | Parker . | |
| 4,992,783 | 2/1991 | Zdunek et al. ...................... | 340/825.34 |
| 5,046,082 | 9/1991 | Zicker et al. .............................. | 379/59 |
| 5,091,942 | 2/1992 | Dent .................................... | 455/411 X |
| 5,237,612 | 8/1993 | Raith .................................... | 455/411 X |
| 5,241,598 | 8/1993 | Raith .................................... | 455/433 X |
| 5,257,412 | 10/1993 | Tomioka et al. . | |
| 5,297,191 | 3/1994 | Gerszberg . | |
| 5,297,192 | 3/1994 | Gerszberg . | |
| 5,301,223 | 4/1994 | Amadon et al. . | |
| 5,315,638 | 5/1994 | Mukari ...................................... | 379/58 |
| 5,386,455 | 1/1995 | Cooper . | |
| 5,386,468 | 1/1995 | Akiyama et al. .......................... | 379/62 |
| 5,414,753 | 5/1995 | Ehara . | |
| 5,457,737 | 10/1995 | Wen .......................................... | 379/62 |
| 5,485,505 | 1/1996 | Norman et al. ............................ | 379/58 |
| 5,513,245 | 4/1996 | Mizikovsky et al. .................... | 455/411 |
| 5,553,311 | 9/1996 | McLaughlin et al. ................... | 395/884 |
| 5,553,314 | 9/1996 | Grube et al. .............................. | 455/89 |
| 5,572,193 | 11/1996 | Flanders et al. .................... | 340/825.34 |

FOREIGN PATENT DOCUMENTS

| | | |
|---|---|---|
| 2256113 | 5/1992 | United Kingdom . |
| 2 296 160 | 6/1996 | United Kingdom . |

OTHER PUBLICATIONS

CM–H333, Sony, "Portable Cellular Telephone with Accessories, Operating Instructions".

CM–H333, Sony, "Portable Cellular Telephone, Instruction for Programming NAM Data".

*Primary Examiner*—David R. Hudspeth
*Assistant Examiner*—Scott Richardson
*Attorney, Agent, or Firm*—Ronald P. Kananen

[57] ABSTRACT

A module (P-code module) provides parameter information to a Number Assignment Module (NAM) in a cellular phone unit by processing a simple programming code (P-code) entered by the user through a telephone keypad. The P-code employs a flexible length telephone keypad coding that can be translated into programmable parameters of cellular phone products. Field identification numbers and look-up tables are used to shorten the P-code length for more frequently used information. To activate a cellular phone, the user provides product and serial number information to a dial-up access center which then generates a scrambled P-code for entry by the user. The P-code module within the processor unit of the cellular phone likewise descrambles, decompresses, and performs an integrity check on the sequence of digits being entered by the user. This P-code module reduces the technical requirements for programming a cellular phone purchased at the retail level such that a user can perform the necessary programming for activating the cellular telephone on a local telephone network. A security arrangement randomly generates two passwords when the cellular telephone is activated to prevent unauthorized reprogramming of the phones for use on other cellular telephone networks.

25 Claims, 4 Drawing Sheets

PROGRAMMABLE CELLULAR TELEPHONE AND SYSTEM

This application is a continuation-in-part of copending application Ser. No. 08/366,502, filed Dec. 30, 1994.

FIELD OF THE INVENTION

This invention relates to a cellular telephone distribution system and the programming of cellular phone products for use in a communication network. More particularly, this invention relates to a cellular telephone system in which a phone may be programmed by a user without a need for dealer involvement.

BACKGROUND OF THE INVENTION

Conventional cellular telephone products need specialized knowledge and trained personnel to input data for programming network operation parameters such as a telephone number, a system identification (SID) number, and a default system control channel number. Because of the technical expertise required to program cellular telephone products for use by a customer, specialized distribution channels distribute and implement cellular telephone products onto a network. After a user purchases hardware from a dealer, time-consuming paperwork involving the user, dealer, and network is required to establish a network service contract. Additional sophisticated work to program the telephone is carried out between the dealer and the network before a customer can use the product.

Hence, there is a need for a cellular telephone product which can be programmed by a user without the need for complicated and time-consuming programming by a dealer.

SUMMARY OF THE INVENTION

A general object of this invention is to overcome these and other drawbacks of prior art cellular telephone products and systems by providing a system where a typical user can readily program the necessary information to incorporate a cellular telephone into a network without assistance from a dealer.

According to one aspect of the invention, a coding scheme is utilized.

According to another aspect of the invention, information is exchanged between a hardware supplier and a network operator. This information is stored in a cellular phone and made available at a dial-up access center as a look-up table or other data structure so that a user is given an appropriate simple instruction to program the phone. Data compression may then be employed to minimize actual steps of end-user key input.

In another aspect of the invention, security is ensured by scrambling coded segments of programming information sent by a regional dial-up access center to a user. Accordingly, the cellular phone includes a processor unit for descrambling the scrambled segments of programming information input by a phone user through a telephone keypad. Such scrambling and descrambling is effected by generating and distributing keys in a secured way to necessary parties. This encoding scheme protects against usage of an unauthorized product and usage of any product by an unauthorized user. In addition, programming mode passwords allow the hardware supplier and network operator to provide phones for use on a particular network, without risk that the phones will be reprogrammed for use on another network.

Finally, according to another aspect of the invention, accidentally embedded mistakes in a programming code sequence input by a user are detected by a processor unit in a phone which checks coding integrity.

DETAILED DESCRIPTION OF THE INVENTION

Programmable Cellular Telephone

Figure 1:
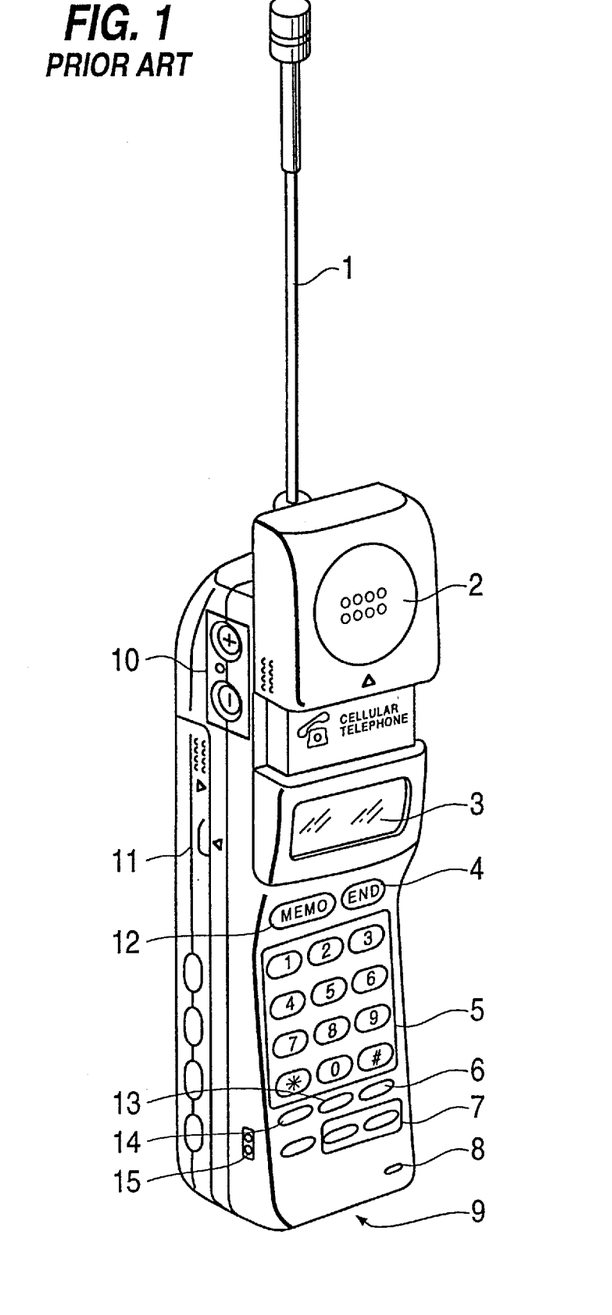
FIG. 1 is a perspective drawing of a conventional cellular phone.

The present invention provides a programming code (P-code) module for providing parameter information to a Number Assignment Module (NAM) in a cellular phone unit. FIG. 1 shows a standard cellular phone unit including a telephone keypad for entering the programming code to activate the phone onto a network system, as will be described in detail below. Typically, the P-code module is provided by the manufacturer to relax dealer involvement in programming. However, the P-code feature may be provided as a retrofit module.

Figure 2:
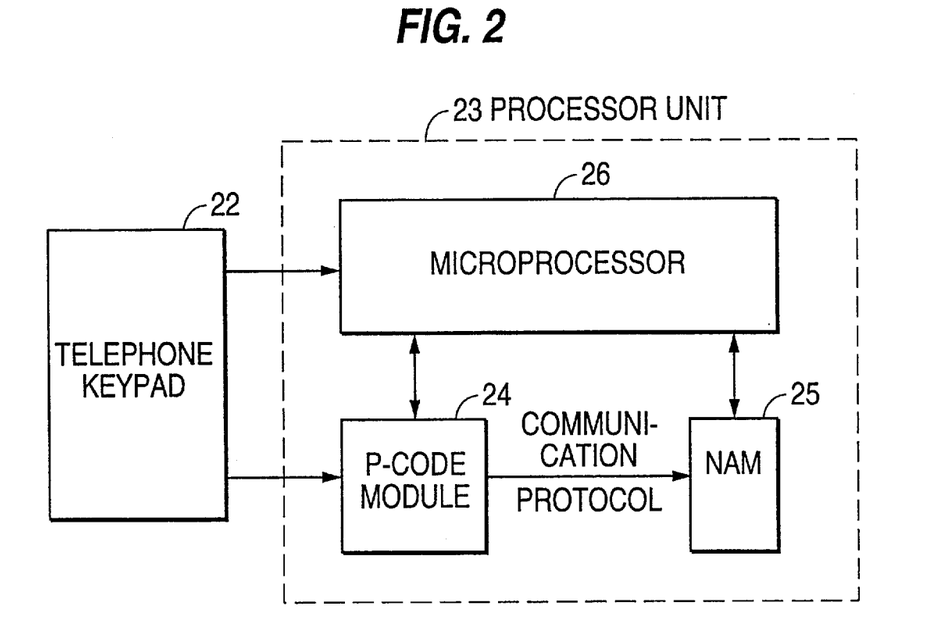
FIG. 2 is a schematic diagram of a cellular phone processor unit according to one embodiment of the present invention.

As shown in the embodiment of FIG. 2, the P-code module 24 communicates through a standard communication protocol and can be added on a separate integrated chip for communication with an existing NAM 25 in a cellular telephone processor Unit 23. The cellular phone has a processor unit 23, including a microprocessor 26 for controlling operation of the cellular phone. The P-code module 24 is connected between a telephone keypad 22 and the NAM 25. To activate the cellular telephone onto a telephone system network, signals from the keypad 22 are sent to the P-code module 24 for processing. The P-code module 24 then outputs NAM parameter information according to a standard communication protocol (not shown) for storage in the NAM 25.

Alternatively, the P-code module 24 may be integrated within a communication protocol and a NAM package. In either case, the P-code module consists of a processor utilizing a combination of firmware, software, and/or hardware to effect the processing of programming (P-code) information input through the telephone keypad by a user as described below.

P-code

According to the present invention, the programming code (P-code) is used to encode Number Assignment Module (NAM) information and other product information for a mobile cellular telephone. The P-code employs a flexible length telephone keypad coding that can be translated into programmable parameters of cellular phone products. Accordingly, the P-code can be entered by the user through the telephone keypad according to instructions provided in an activation process by the dial-up center.

In a preferred embodiment, the code ranges from 7 to 32 digits corresponding to the numerals and characters on a telephone keypad (123-456-789-*0#), where the characters * and # are considered to be numerals 10 and 11 respectively. Using more or less digits to accommodate different dialing systems and features is within the purview of an artisan.

The simple user-friendly P-code contains an embedded sequence of information which enables a more complex sequence of cellular phone parameters to be stored into a NAM including phone numbers (area code/dialing prefix/phone number (MIN1, MIN2)), system identification (SID, SIDH), network-operation-related parameters (such as Initial Paging Channel (IPCH)) and other product-stand-alone setting values (such as special speed dialing settings). Field identification numbers and look-up tables are used to reduce the number of digits which must be entered by a user. Using fields to identify segments of the P-code sequence also allows portions of the NAM information to be omitted from the P-code in accordance with the options selected by the user, whereupon default settings for the NAM can then be relied upon without further programming by a user.

Thus, the P-code reduces the technical requirements of programming a cellular phone purchased by a user at the retail level such that a user can perform the necessary programming for activating the cellular telephone without complex involvement of the dealer. An example of a P-code and its operation within a system for activating a cellular phone will now be described in detail.

Required NAM Information

To activate the cellular phone, the P-code must encode in the P-code module at minimum the required NAM information for identifying the directory phone number of the mobile unit. A typical ten-digit North American directory phone number consists of a three-digit area code, a three-digit dialing prefix or exchange, and four-digit address number. The ten-digit phone number is translated, however, from decimal form to a 34-bit binary number MIN when written in memory in the NAM. More specifically, the three-digit area code is represented by a ten-bit binary number MIN1 and the seven-digit directory phone number (3-digit dialing prefix or exchange and 4-digit address number) is represented by a 24-bit binary number MIN2.

Other required NAM information may include information relating to a home system identification number SIDH for the cellular unit (5 digits), initial paging channels in the home mobile service area (IPCH) (four digits), or a preferred system selection PS (1 digit). Previously, even in an abbreviated programming mode limited to the entry of required NAM information, a sophisticated dealer would be forced through a sequence of programming steps requiring the direct input of the NAM information.

To facilitate the entry of the P-code sequence by the user, the present invention also utilizes data compression to minimize the number of digits of the P-code needed to encode the required NAM information for more frequently used phone numbers. Different components of the required NAM information are stored in data structures such as a look-up table addressed by a field identification number (field ID). Accordingly, the field identification number (ID) can be used in a P-code segment to access stored NAM information such as a commonly used area-code or dialing prefix. Other particular information not included in the table can be provided directly within a P-code segment.

Table I lists the different cases for programming required NAM information along with each respective field ID and P-code segment for activation of a cellular phone according to a preferred embodiment.

TABLE I

Required NAM Information

| | North American Phone Number | | | P-Code Segment | | |
|---|---|---|---|---|---|---|
| Case | Area Code | Prefix | SID | Field ID | Program Segment | Total Length (in digits) |
| "well-known" | known | known | known | "1" | 2-look-up table index<br>4-address number | 7 |
| "heard of" | known | unknown | known | "2" | 2-look-up table index<br>3-prefix<br>4-address number | 10 |
| "heard of" | known | known | unknown | "3" | 2-look-up table index<br>4-address number<br>5-SID | 12 |
| "heard of" | unknown | unknown | known | "4" | 2-look-up table index<br>3-area code<br>3-prefix<br>4-address number | 13 |
| "unknown" | unxnown | unknown | unknown | "5" | 3-area code<br>3-prefix<br>4-phone address<br>5-SID | 16 |

| | Phone Number Outside North America | | | P-Code Seqment | | |
|---|---|---|---|---|---|---|
| Case | Area Code | Prefix | SID | Field ID | Program Segment | Total Length (in digits) |
| "alien" | — | — | — | "601" | 10-MIN<br>5-SID | 18 |
| "alien" | — | — | — | "602" | 10-MIN<br>5-SID<br>3-display prefix | 21 |

TABLE I-continued

Required NAM Information

| | P-Code Segment | | |
|---|---|---|---|
| Other Required NAM Information | Field ID | Program Segment | Total Length (in digits) |
| Initial Paging Channel in Home (IPCH) | "61" | 4-IPCH | 6 |
| Preferred System A | "62" | None | 2 |
| Preferred System B | "63" | None | 2 |

In Table I, the first five rows contain phone number information to be stored in a NAM to activate the phone according to a North American dialing plan. North American phone numbers for cellular phones are classified by their area code, exchange, and SID. For a North American dialing plan, field identifications "1" to "5" denote categories ("well-known", "heard of", or "unknown") for classifying a cellular phone number depending on whether the area code, exchange, or SID information has been previously stored in the phone unit look-up tables. For example, in a "well-known" case where area-code, dialing prefix, and SID information have been compressed in a table identified by the field ID number and addressed by an index, the corresponding P-code segment need only contain the field ID number (1 digit) identifying the field look-up table for the P-code, the look-up table index (2 digits), and the four-digit phone address number (seven digits total) in order to obtain the complete fifteen digit phone and SID number for the NAM.

On the other hand, if the phone number does not follow a North American dialing Plan (an "alien" case), then the P-code segment must contain a different field ID and complete MIN and SID information as shown in row 6 of Table I. A display prefix override capability is achieved by adding three digits for the prefix to the P-code segment (row 7).

As shown in rows 8 to 10 of Table I, networks may require NAM information regarding an Initial Paging Channel in Home (IPCH) and Preferred-System Selection (PS) when default settings based on the SID are otherwise not utilized. IPCH information, the number of the first control channel used for paging mobile stations, is identified by field ID "61" and a four-digit P-code program segment (Row 8). PS information for selecting system A or system B can be identified directly by the corresponding field ID "62" or "63" (Rows 9 and 10).

Table II is an example of a look-up table stored at the dial-up access center and in the cellular phone unit for a "well-known" case where the field ID is "1".

TABLE II

Look-Up Table Structure

LUT: field id = 1
"well-known"

| Index | Area Code | Prefix | SID | Extended Option |
|---|---|---|---|---|
| 00 | 202 | 955 | 12345 | 61 |
| 01 | 202 | 956 | 12345 | 62 |
| ... | | | | |
| 89 | 703 | 658 | 12345 | 63 |

As described above, the rows of the look-up table are indexed by a two-digit look-up index. Each row contains known NAN information on the phone unit's area code, prefix, and SID. In addition, an extended option field is included which can be a pointer or an index to an additional table containing other information which might be required such as Initial Paging Channel in Home (IPCH) and Preferred-System Selection (PS) information. This field is set to "UNDEFINED", however, when networks use a default setting.

Preferably, the most frequently used area code, exchange, and SID numbers are stored in the look-up table (Table II) and associated with a field ID code so that users typically would often enter fewer digits in their P-code.

In addition to required NAM information, a P-code sequence may include further P-code segments and corresponding field IDs to store information within the NAM regarding various optional features selected by a user. Table III lists optional NAM information along with respective field ID and P-code segments according to a preferred embodiment of the present invention.

TABLE III

Optional NAM Information

| | | | P-Code Segment | |
|---|---|---|---|---|
| | Optional NAM Information | Field ID | P-Code Segment Length | Total Length |
| 1 | Option (coding may vary depending on models) | 64 | 3 digits | 5 digits |
| 2 | RH = roaming allowed | 651 | none | 3 |
| 3 | RH = roaming inhibited | 652 | none | 3 |
| 4 | Local Control Option LU | 653 | 1 digit | 4 |
| 5 | MIN Mark | 654 | 1 | 4 |
| 6 | SCM | 66 | 1 | 3 |
| 7 | IDDCA | 671 | 4 | 7 |
| 8 | IDCCS | 672 | 4 | 7 |
| 9 | GIM | 68 | 2 | 4 |
| 10 | ACCOLC | 69 | 2 | 4 |

As shown in row 1 of Table III, different options which can vary according to the phone model are set by a P-code segment comprising a field ID "64" to identify the "options" field. A corresponding 3-digit P-code segment contains information on the respective options or an address for a look-up table which stores appropriate binary information on the selected options. For example, these options may include settings for activating and deactivating the Call Timer Display, for counting outgoing calls or both outgoing and incoming calls, for deactivating and activating call timers, or for reserving other option settings for future applications. Thus, unlike prior art programming, a user need only input a five digit decimal number as instructed by the user and need not be familiar with specific binary setting values and sequences.

In a similar fashion, P-code segments and field IDs, where necessary, may be used to enter NAM information on the following options as shown in Table III—

Roaming (RH)—automatic initiation or reception of a call for outside of the preferred home system may be allowed or inhibited by inputting a P-code segment "651" or "652" respectively (rows 2 and 3).

Local Control Option (LU)—a local control may be enabled or disabled by a control means within the mobile station in accordance with the P-code segment in row 4: field ID "653" and single-digit consisting of the number 0 (disabled) or 1 (enabled).

Mobile Identification Mark (MIN mark—Es & EXp)— Identifies the stored value of the E field sent on the forward control channel. Es or EXp identify whether a home mobile station must send only MIN1p or both MIN1p and MIN2 when accessing the system. Unlike the Es value, EXp is stored in a mobile station's security and identification memory. The P-code segment for entering MIN mark information is provided in row 5: a field ID "653" and a single-digit consisting a number, i.e. 0 or 1, which indicates the setting of the MIN mark.

Station Class Mark (SCM)—As shown in row 6, station class information can be provided in a three-digit P-code segment consisting of a field ID "66" and a single decimal digit indicating station class information or an address to a table containing binary station class information, i.e. 1110.

Initial Dedicated Control Channel System information for System A (IDCCA) and System B (IDDCB) is provided by the P-code segments shown in rows 7 and 8 respectively. IDDCA identified by field ID 671 can be set to 0333 by the 4-digit P-code segment, while IDDCB identified by field ID 672 can be set to 0334 by the 4-digit P-code segment.

Group Identification Mark (GIM)—The P-code segment for entering GIM information is provided in row 9: field ID "68" and two-digits consisting of numbers, i.e. 00 to 15, which indicate the setting of the GIM mark.

Access Overload Class Information (ACCOLC)—The P-code segment for ACCOLC information to identify which overload class field controls access attempts by the mobile station is provided in the last row 10: field ID "69" and two-digits, i.e. 0+ last digit of the phone number.

P-code segments containing unique field ID and other P-code digits can be used to identify information regarding optional personal settings, as well, including: One-Touch/Speed Dialing Memory Entries, A/B System Selection, Automatic Answer Selection, VOX (Voice Activated Discontinuous Transmission), NAM Selection, and Timer Reset.

P-code System

Figure 3:
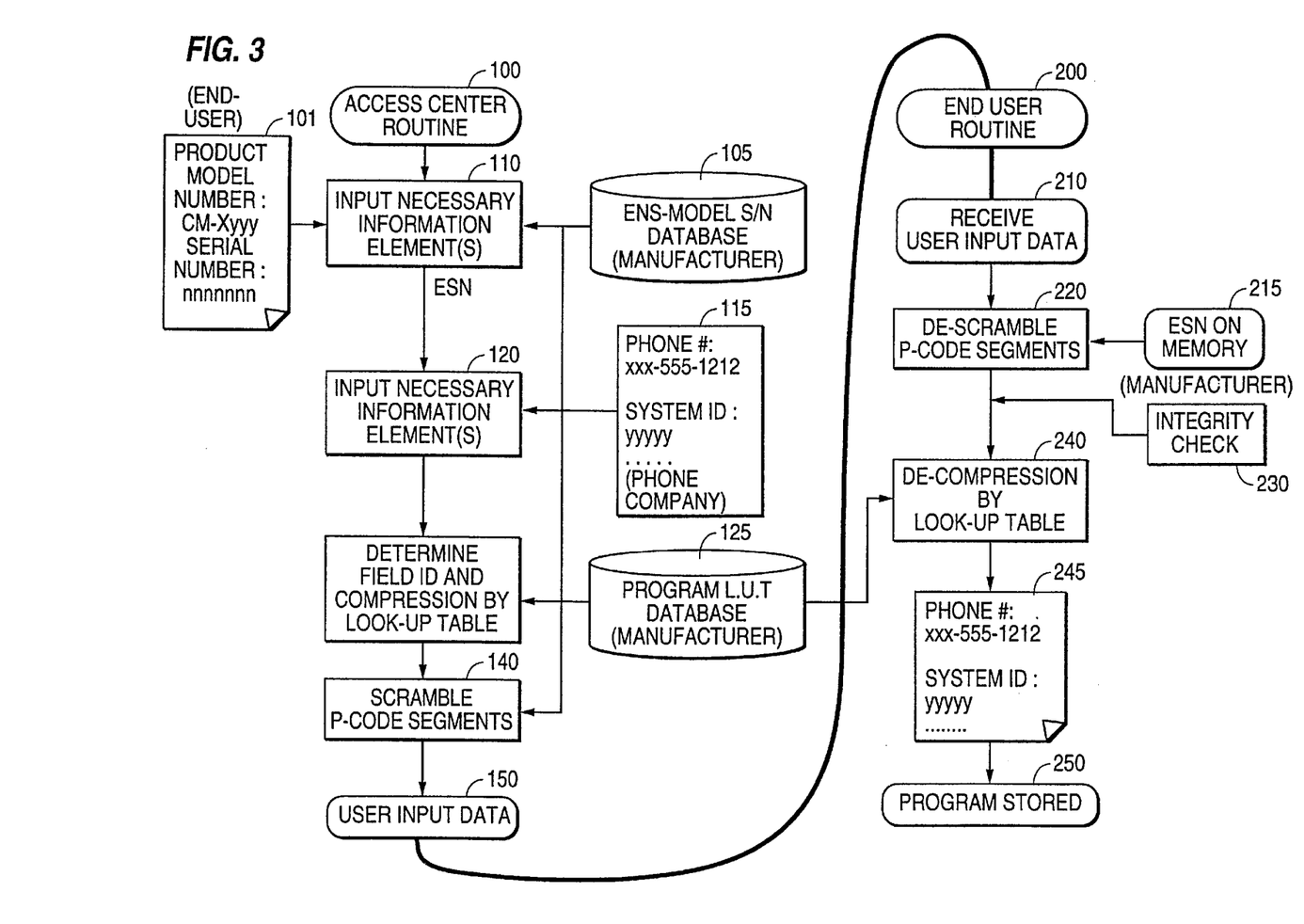
FIG. 3 is flow diagram showing the overall operation of a cellular phone network implementing a P-code system according to the present invention.

FIG. 3 is flow diagram showing the overall operation of a cellular phone network implementing the P-code system according to the invention. According to this P-code system, an access center routine 100 and an end user phone routine 200 are conducted to generate and store the necessary system information in the NAM module of the phone.

Steps 110 to 150 of the access center routine 100 are preferably carried out under the control of a software-driven central processing unit (CPU) at an access center. Steps 210 to 250 of the phone routine are preferably effected through firmware installed with the P-code module 24 on a separate chip within the cellular phone product. Other combinations of firmware, hardware, or software for conducting any or all of the steps of the access center routine 100 and the phone routine 200 are well within the skill in this art.

As shown in FIG. 3, the dial-up access center receives product model number and serial number information (LSN) (available from the phone dealer or listed on the phone) from the user at step 110. An electronic serial number (ESN) is derived from an LSN/ESN database 105 which correlates the ESN and LSN information. In this manner, the customer is not made aware of the ESN. The ESN is 32-bit binary number that uniquely identifies the mobile station and is installed permanently in the cellular phone as shown in step 215. Because the ESN is factory-set and hard-coded, special facilities are required to modify the number.

The ESN may be randomly generated at the time of manufacture and stored in the database 105 along with the corresponding LSN. In this manner, access to the ESN information corresponding to a particular phone/LSN can be restricted to only authorized personnel with access to the database 105.

The hard-coded ESN can be permanently changed by the manufacturer if it is desired to further restrict access to the ESN information. In addition to changing the ESN, a completely separate block of manufacturer's label serial number and/or carton box bar codes that is not associated with the ESN of the phone may be used. These steps will help prevent reprogramming of phones equipped with the present invention for use with a different network provider.

Customer application information (not shown) may also be provided by the user to enable a dial-up access center to perform a credit check or pursue a cash deposit option. The access center can then generate necessary subscription data and interface with a local cellular phone network service company to open an account for service contract for a purchaser and/or user without further involvement from the user. As a result, at step 115, the network service company assigns a phone number and a system identification number (SID) and provides the information to the access center at step 120.

Next the access center generates a P-code sequence corresponding to the phone number and SID information and other required and optional NAM information selected by the user (step 130). Appropriate field IDs and P-code segments are determined in accordance with a program look-up table database 125 to identify the NAM information being programmed by the user (step 130).

Scrambling of P-code information is performed at step 140 based upon the ESN number and secured key codes. The scrambled result in a telephone keypad format is provided by the access center at step 150 to a user at which point the end user phone routine 200 begins. In step 210, the user inputs the P-code data through the telephone keypad as instructed by the access center at step 150. Scrambled data is descrambled at step 220 in accordance with the ESN number and key codes stored in memory within the phone product (step 215). The integrity of the entry of the data input by the user is checked at step 230.

Finally, after the descrambling (220) and integrity check (230) steps, the data is decompressed at step 240. In particular, phone number and SID information (245) are retrieved from the look-up table, in accordance with the received preamble and the descrambled P-code segments, and then stored in the NAM (step 250).

Scrambling Algorithm

Security is provided for the activation process by scrambling the information exchanged between parties. Using encoded information protects against unauthorized use of the product. An example of the scrambling and descrambling algorithms for carrying out steps 140 and 220 will now be described in detail.

Key codes are generated and distributed in a secured way to the necessary parties—the dial-up access center and the manufacturer. At the dial-up access center each P-code sequence, except for the P-code integrity information relating to the preamble and postamble data, is scrambled based on the secured key codes provided by the manufacturer and the ESN of the cellular phone unit which is derived from the confidential LSN-ESN table. Likewise, the phone microprocessor 26 or P-code module 24 includes software or firmware to descramble the scrambled P-code input by reversing the steps used to scramble the P-code. Thus, the phone uses the stored key codes provided by the manufacturer and its stored ESN to decipher the unencoded P-code sequence.

Initial Scramble Key

A preferred scrambling algorithm according to the present invention calculates a first four-digit hexadecimal scramble key by multiplying the least significant 16 bits of the ESN (the last four hexadecimal digits) by a prime decimal number and adding each hexadecimal digit of the product to the most significant 16 bits of the ESN (the first 4 hexadecimal digits).

Both the dial-up access center and the phone unit have a 16-row×11-column scramble table. The rows of the table are addressed by hexadecimal digits while the columns are addressed by the P-code input digits corresponding to the telephone keypad (0–9, *, #). The tabular entries for each respective row consist of an arbitrarily selected sequence of telephone keypad inputs (0–9, *, #).

A scrambled P-code which is actually sent to the user for input is obtained from the entries of the scramble table at addresses (row, column) determined by the first scramble key (row) and the unencoded P-code input (column). For instance, the first digit of the encoded P-code corresponds to the entry from the scramble table at the (row, column) address given by (first digit of the first scramble key, first digit of the unencoded P-code input). Thus, the first digit of the encoded P-code input corresponds to the entry of the scramble table at the row address equal to the first digit of the first scramble key and at the column address equal to the first digit of the unencoded P-code input.

Successive digits of the scrambled P-code correspond to the tabular entries addressed by the successive digits of the first scramble key and the successive digits of the unencoded P-code input. In this manner, the four digit first scramble key is used to scramble the first four digits of the unencoded P-code sequence (i.e. the P-code segment(s) after the preamble "01").

Successive Scramble Keys

By adding the digits of the first key and the digits of the unencoded P-code input in a modulo-16 calculation (*=decimal 10, #=decimal 11), a second scramble key may be obtained which is then used to scramble the next four digits of the unencoded P-code according to the scramble table. Thus, successive scramble keys may be generated by similarly adding the previous scramble key and the previous unencoded P-code input until the end of the unencoded P-code input is reached. When the P-code is segmented into segments terminated by a termination [STO] entry as described below, the scramble key returns to the original first scramble key for re-sequencing.

All coded items except the P-code (integrity) information (i.e. preamble and postamble data) are prefixed by field ID information. This allows any part of the information to be discarded from the P-code generation as an option to use default. The generation and scrambling of the P-code segments will become even more clear in the following example.

Table IV illustrates an example of a P-code sequence for programming a cellular phone unit according to the present invention. The unscrambled P-code sequence consists of the following: a preamble identifying the appropriate P-code version in effect, a first P-code segment for providing the required NAM information on a frequently-used, "well-known" North American phone number, a second P-code segment for providing optional NAM information on ACCOLC, and a postamble digit for a check sum operation.

As shown in the table, the two-digit preamble is communicated to the user unscrambled. Thus, the first four digits of the first P-code segment are scrambled by a four-digit original scramble key (orig1–orig4) generated by the dial-up center based on ESN information as described above. The scrambled result derived from the scramble table of key codes at the access center forms the actual P-code inputted by the user. A next scramble key (nxt1—nxt3) is generated by adding digits of the previous scramble key and the previous unencoded P-code input. The remaining three digits of the unencoded P-code segment are then scrambled according to the next scramble key. To signal the termination of the first segment, the user presses STO.

The second P-code segment is similarly entered and scrambled; however, since it is only four digits in length, a next key is not needed. Finally, an unscrambled check-sum postamble digit and the END terminator key are depressed to conclude the entire P-code sequence.

TABLE IV

P-Code Sequence

| Notes | Unscrambled P-Code | Key | Scrambled Result (Actual input P-Code) | Next key = key + unencoded input |
|---|---|---|---|---|
| preamble 1 | 0 | n/a | 0 | n/a |
| preamble 2 | 1 | n/a | 1 | n/a |
| field ID | 1 | 1(orig1) | 3 | 2(nxt1) |
| lut index 1 | 0 | A(orig2) | 1 | A(nxt2) |
| lut index 2 | 1 | 1(orig3) | 3 | 2(nxt3) |
| phone #1 | 2 | 7(orig4) | 9 | 9(nxt4) |
| phone #2 | 9 | 2(nxt1) | 7 | B(nxt5) |
| phone #3 | 6 | A(nxt2) | 5 | 0(nxt6) |
| phone #4 | 2 | 2(nxt3) | 2 | 4(nxt7) |
| postamble c.d. | 1 | n/a | 1 | n/a |
| Segment terminator | [STO] | n/a | [STO] | n/a |
| preamble 1 | 0 | n/a | 0 | n/a |
| preamble 2 | 1 | n/a | 1 | n/a |
| field ID 1 | 6 | 1(orig1) | 6 | 7 |
| field ID 2 | 9 | A(orig2) | 0 | 3 |
| ACCOLC1 | 1 | 1(orig3) | 3 | 2 |
| ACCOLC2 | 2 | 7(orig4) | 9 | 9 |
| postamble check digit | 8 | n/a | 8 | n/a |
| P-code sequence terminator | [END] | n/a | [END] | n/a |

Entry of P-code Segments

The entry of the P-code segments and the integrity check step 230 will be now described in detail.

User interface software in the P-code module 24 within the cellular telephone may not be able to buffer more than 32 characters at a time. Accordingly, the P-code sequence is segmented by the generation software (the Customer Dial-Up Center attendant console program) in groups of shorter sequences less than 32 digits. The user then enters a sequence of digits and at the end of the sequence presses a STO key which initiates processing of that sequence by the phone unit's decoding software. For the final sequence of digits, the user is instructed to press an END key. The entire updated NAM information is then written into the actual NAM entry.

Input Integrity Check

If an error is detected by the phone software or firmware during the input of a sequence, a "Try Again" display and audible error tone advise the user to repeat the entering of the sequence. When a sequence of digits entered by a user passes an integrity check, a "Go Ahead" display and audible success tone are emitted to notify the user that the sequence has been entered successfully and that the next sequence may be input.

The last sequence of P-code data is followed by pressing the END key. The complete P-code sequence is checked for integrity when the END key is entered as described above. If the integrity check clears the entered P-code data, then the cellular phone unit issues a standard "Wake-Up" display and associated tone indicating that the unit is ready for normal usage. When the END key is pressed, however, and the programming data does not yet contain a valid MIN (non-000000) phone number, the entire input data is discarded and the unit returns to the P-code input prompt.

A recall (RCL) key is provided which temporarily activates the upper-digit display during P-code input mode.

Segment Integrity Check

The integrity checks carried out by the P-code module 24 within the processor unit 23 for each P-code segment entered by the user will now be described in more detail. If any of these checks indicates an error, the system indicates that an erroneous segment entry has been encountered and returns the phone unit to the previous state of that particular segment input.

Preamble Check

The preamble data input through the phone keypad is compared to the stored look-up table ID to ensure it matches the software revision employed in the phone unit.

Postamble (Check Digit) Check

A check sum operation is used to verify the postamble (check-digit) data.

Parameter Length Check

The length of each parameter sequence for a particular field ID may be provided in a segment. The length of the actual sequence of data entered for the field is then checked against the predetermined length allotted for the segment.

Undefined Field ID Check

The field ID in the segment is checked against stored field ID information in the phone unit to ensure that it is a value found in the system.

Look-Up Table Index Range

The look-up table index specified in the sequence of P-code data is verified to be within the range for the look-up table index corresponding to the particular software revision.

MIN Digit Check

The MIN digit information is checked to ensure non-decimal characters * or # do not appear in the MIN sequence.

SID Check

The segment providing SID information is checked to ensure the specified SID is within range, for example, between 00000–23767.

Options Check

Segments providing various options for the phone are checked for compatibility with the unit's specification.

LU and MIN Mark Checks

Segments providing LU or MIN Mark data information are checked to ensure the information is within range.

SCM Check

The segment providing SCM data is checked to ensure the SCM data is within range, for example, 10 or 13.

GIM Check

The segment providing GIM data is checked to ensure the GIM data is within range, for example, within 00–15.

ACCOLC Check

The segment providing ACCOLC data is checked to ensure the ACCOLC data is within range, for example, within 00–15.

Checks for information on optional personal settings may likewise be made.

In this manner, successful programming by the user is further facilitated and guaranteed as the phone unit is self-contained with error-detection coding which notifies the user if a mistake is made in the input sequence.

P-code Programming Flow Chart

Figure 4:
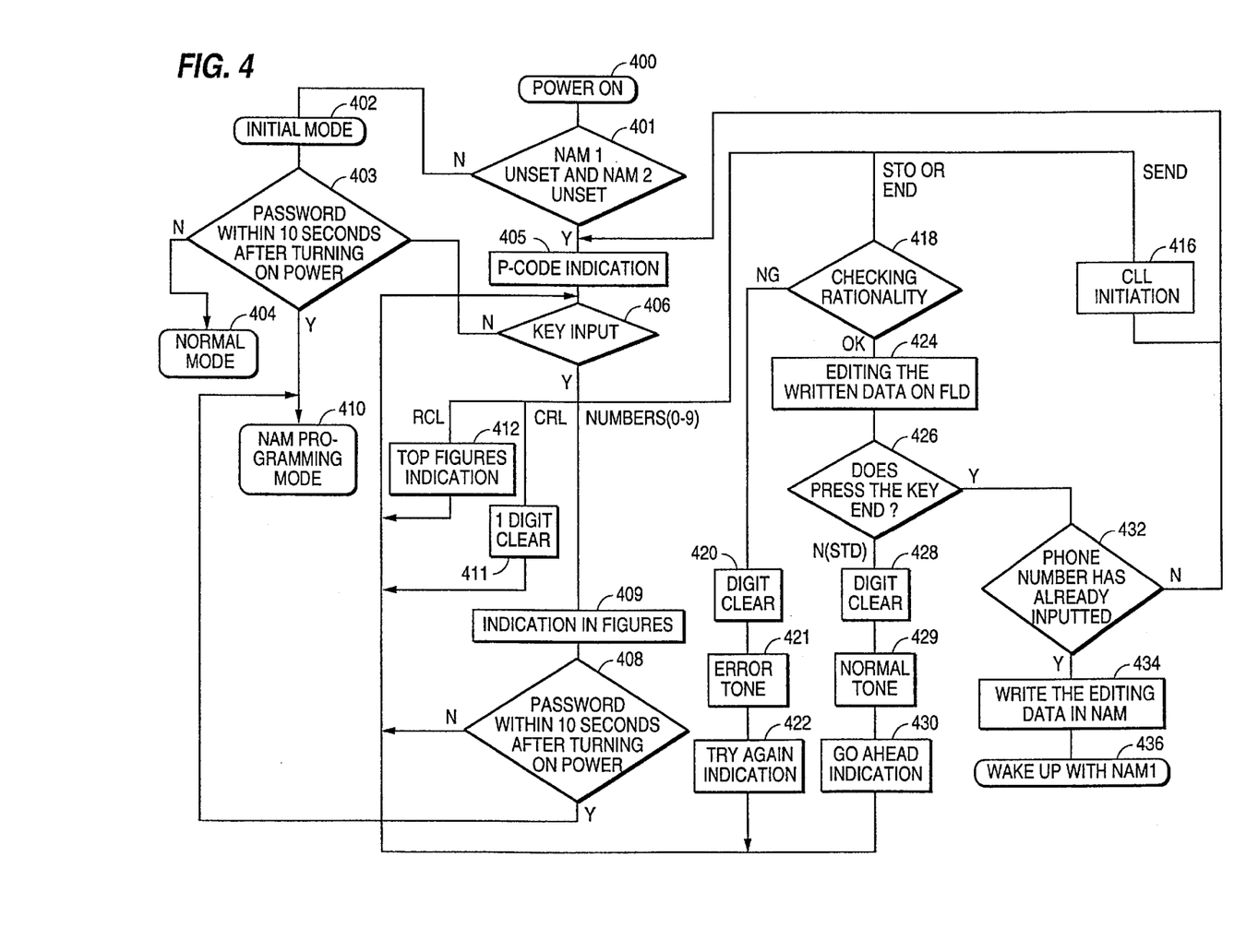
FIG. 4 is flow diagram illustrating overall operation of a cellular phone according to the present invention.

The overall programming operation of a cellular phone according to the present invention is set forth in FIG. 4. The cellular phone is initially set at the factory to a special P-code input mode. For example, all NAM entries (NAM1and NAM2) are erased by the phone manufacturer according the value MIN=00000000. When the phone is turned on (step 400) a system power-on sequence begins to check that all system components are on. If erased unset NAM entries are identified at step 401, the system displays a "P-Code 01" prompt (step 405) and is readied to receive further key input from the telephone pad (step 406).

The P-code may be directly entered; however, to enhance security, a proper programming password must be entered by the user (step 408) before the phone passes to NAM programming mode (step 410). As the telephone digits are pressed to enter the password or P-code, each digit is displayed on the upper display of the phone to verify the keystroke to the user (step 407). A recall key may be pressed to display the digits which have been most recently entered through the telephone pad (step 412) to verify to the user and access center which digits have been entered. The clear key provides a single digit signal instructing the phone system to clear the display (step 414). After the recall and clear key signals have issued, the phone system returns to step 406 to await further key input. Pressing the send key initiates a call at step 416 to the dial-up center. Afterwards, the phone returns to indicate the P-code (step 405).

Once entry of P-code segments is begun during the NAM programming mode, a STO key denotes the end of a segment and the end key indicates the end of the entire P-code sequence. When the STO or END key is pressed an integrity check is performed (step 418) to check the integrity of the field ID and P-code segment entered by the user as described above. If the integrity check finds an erroneous entry, the system clears the digits (step 420), emits an error tone (step 421), and flashes a "Try Again" message (step 422) before receiving further key input at step 406.

If the integrity check is successful, a segment of NAM information data obtained from the P-code segment is edited at a temporary storage location (step 424). If an END key has not yet been encountered at step 426, the system clears the digits (step 428), emits a normal tone (step 429), and flashes a "Go Ahead" message (step 430) before receiving further key input at step 406. When an END key is received at step 426, a check is made on whether a complete phone number has been received (step 432) and if not the system is reset to the initial P-code indication (step 405).

If a complete phone number has been entered, the editing NAM information data is written into the NAM module from the P-code module (step 434). Subsequently, unless the phone is otherwise instructed, the phone wakes up and operates on the network based on the NAM1, NAM2 information written into its NAM by the P-code programming sequence.

Alternatively, if a full programming sequence has already been completed for the phone as described above, the NAM entries will contain entries at step 401. The P-Code input mode will not be activated and an initial mode (step 402) will be initiated. The phone will then pass to a normal mode of operation (step 404) unless a password is promptly entered by the user indicating that the user wants to enter new NAM information into the phone (step 403).

If a password is entered by the user for programming NAM information, the phone passes to the P-code NAM programming mode (step 410). P-code segments are then entered as described above and the new programming information is written into the NAM. At the end of the sequence the phone will then wake up according to the new NAM1 information and function in a normal mode.

Finally, regardless of whether the P-code activation procedure has been implemented to enter phone number information, emergency (911) and operator-assisted override (611) phone calls can be made using a default setting such as an empty MIN.

Programming Mode Security

In a preferred embodiment, the present invention provides additional programming mode security by using randomly generated passwords that allow the hardware supplier and network operator to provide phones for use on a particular network, without risk that the phones will be reprogrammed for use on another network.

In this embodiment, the P-code software is modified to randomly generate new passwords for each individual unit at the time of activation of the phone. These passwords are stored at the service center database and are not disclosed to the user until, for example, the user calls in later to cancel the account or move to another region within the control of the network operator.

There are preferably two passwords generated for each phone. The first password, referred to as the RESET password, is used to return the phone to the P-code input mode so that a new phone number can be reprogrammed into the phone using the P-code. Since the RESET password is accessible only to the network operator, the new phone number can be programmed into the phone, for example, only by the network operator subsidizing the purchase price of the phone.

The second password, referred to as the RELEASE password, is used to permanently cancel the account with the network operator. Again, since the RELEASE password is accessible only to the network operator, the network operator has control over whether or not the user's account will be canceled and the phone thereby released for use with other network providers. Operational procedures are established for both the RESET and RELEASE passwords so that the user can get these numbers either over a phone call to the service center, or by bringing the phone to an authorized service center.

The following algorithms are provided for generating these two passwords:

RESET Password

Using the first eight digits of the MIN (e.g., the ten digit telephone number) assigned to the phone during the P-code activation, generate a scrambled eight digit sequence using, for example, the same scramble algorithm used for scrambling the body part of the P-code (as described above). Store the scrambled eight digits as the RESET password in both the phone's non-volatile memory and the dial-up access center software database.

RELEASE Password

Using the last eight digits of the MIN (e.g., the ten digit telephone number) assigned to the phone during the P-code activation, generate a scrambled eight digit sequence using, for example, the same scramble algorithm used for scrambling the body part of the P-code (as described above). Store the scrambled eight digits as the RELEASE password in both the phone's non-volatile memory and the dial-up access center software database.

These methods for generating the RESET and RELEASE passwords are reasonably random, yet simple to implement the computation algorithm on the phone side and the center side independently. Deciphering from the P-code/RESET password/RELEASE password combination to the ESN, NAM contents and the scrambling algorithm itself is also reasonably difficult even under the circumstances that the intended breaker has obtained a large block of input data because the specification document is maintained in a secured environment.

The foregoing is a detailed description of the preferred embodiment of the invention. The scope of the invention, however, is not so limited. Various alternatives will be readily apparent to one of ordinary skill in the art. The invention is only limited by the claims appended hereto.

What is claimed is:

1. A code module for a cellular phone, comprising:

input means for receiving input signals from a keypad on said cellular phone, wherein said input signals are generated by a sequence of keypad inputs encoding parameter information for activation of said cellular phone;

a processor means for processing said input signals to obtain said parameter information to cause said cellular phone to be activated on a phone network based on said parameter information; and means for randomly generating a password when said cellular phone is activated and for preventing said cellular phone from being reprogrammed until said password is input into said input means.

2. A code module according to claim 1, further comprising a number assignment module NAM connected to said processor means of said code module for storing said parameter information.

3. A code module according to claim 1, wherein said input signals comprise field identification numbers and P-code segments, and said processing means includes a memory containing predetermined information on various parameters addressed by field identification numbers.

4. A code module according to claim 1, wherein said input signals comprise a P-code sequence including a preamble, at least one P-code segment, a checksum, and a sequence terminator.

5. A code module according to claim 1, wherein said processing means includes descrambling means for descrambling scrambled portions of said input signals based on ESN and key codes stored in said cellular phone.

6. A code module according to claim 1, wherein said processing means includes means for checking the integrity of portions of said input signals entered in said cellular phone.

7. A code module according to claim 1, wherein said processing means includes decompressing means for decompressing said input signals.

8. A code module according to claim 1, wherein:
said input signals comprise a P-code sequence including a preamble, at least one scrambled P-code segment, a postamble, and a sequence terminator; and
said processing means comprises:
descrambling means for descrambling said at least one scrambled P-code segment based on ESN and key codes stored in said cellular phone to obtain at least one descrambled P-code field segment comprising a field identification number and corresponding P-code segment information;
checking means for checking the integrity of said P-code sequence entered in said cellular phone including said preamble, said at least one descrambled P-code segment, said postamble, and said sequence terminator; and
decompressing means for determining parameter information from each field identification number and corresponding P-code field segment of said at least one descrambled P-code segment and for transmitting said parameter information to a number assignment module NAM in said cellular phone;
whereby, required NAM information, optional NAM information, and optional personal settings information can be stored in the NAM to enable activation of the cellular phone on a local phone network by the user.

9. A method for programming a cellular phone, comprising the steps of:
generating a P-code sequence;
entering said P-code sequence through a keypad on said cellular phone;
processing said P-code sequence entered through said keypad to obtain parameter information;
activating said cellular phone on a cellular phone service network according to said parameter information obtained from the entered P-code sequence;
randomly generating a password with said cellular phone when said cellular phone is activated;
storing said password in a database accessible only by authorized personnel of said phone service network; and
preventing said cellular phone from being reprogrammed until said password is obtained from said authorized personnel and entered through the keypad of the cellular phone;
whereby a user is able to more easily activate said cellular phone, and said cellular phone is prevented from being reprogrammed without authorization from the phone service network.

10. A method for programming a cellular phone according to claim 9, wherein:
said generating step comprises the step of generating a P-code sequence including at least one P-code segment.

11. A method for programming a cellular phone according to claim 9, wherein:
said generating step comprises the steps of:
obtaining ESN information for the cellular phone;
obtaining number assignment module NAM information including at least phone number and station identification SID information;
encoding said NAM information in at least one P-code segment;
scrambling said at least one P-code segment based on said obtained ESN information and on scramble keys generated from key codes; and
generating said P-code sequence including said at least one scrambled P-code segment.

12. A method for programming a cellular phone according to claim 9, wherein said generating step comprises the step of generating a P-code sequence including a preamble, at least one P-code segment, a checksum, and a sequence terminator.

13. A method for programming a cellular phone according to claim 9, wherein said generating step is performed by processing means at a dial-up access center.

14. A method for programming a cellular phone according to claim 9, wherein said processing step processes said P-code sequence entered through said keypad by using a code module in said cellular phone and stores said parameter information obtained by said processing in a number assignment module NAM of said cellular phone.

15. A method for programming a cellular phone according to claim 9, wherein said processing step includes descrambling scrambled portions of said P-code sequence.

16. A method for programming a cellular phone according to claim 15, wherein said descrambling step descrambles scrambled portions of said P-code sequence using ESN and key code information stored in said cellular phone.

17. A method for programming a cellular phone according to claim 11, wherein said scrambling step comprises the steps of:
generating a first scramble key by multiplying a least significant portion of the ESN by a prime number and adding the product to the most significant portion of the ESN;
generating a scrambled P-code segment by reading a scramble table having key codes at addresses given by the digits of the first scramble key and the corresponding digits of said at least one P-code segment to be scrambled; and
generating a subsequent scramble key by adding the digits of the first scramble key to the respective digits of the scrambled P-code segment generated from the first scramble key.

18. A method for programming a cellular phone according to claim 9, wherein said processing step includes checking the integrity of portions of said P-code sequence entered through the keypad.

19. A method for programming a cellular phone according to claim 9, wherein said processing step includes decompressing each P-code segment in said P-code sequence entered through the keypad to obtain NAM information for activating said cellular phone.

20. A method for programming a cellular phone according to claim 19, wherein said decompressing includes extracting field identification numbers and any corresponding P-code field segment from each P-code segment and determining said NAM information obtained in said processing step from a memory in the cellular phone based on the recognized field identification number and corresponding P-code field segment, whereby, required NAM information, optional NAM information, and optional personal settings information may be stored in the NAM to enable activation of the cellular phone on a local phone network by the user.

21. A method for programming a cellular phone, comprising the steps of:

activating a cellular telephone on a cellular telephone service network by entering a code sequence into a keypad of the cellular telephone;

generating a password upon activation of said cellular telephone, said password being generated by said cellular telephone;

storing said password in a database accessible only by authorized personnel of said telephone service network;

storing said password in a nonvolatile memory in said cellular telephone; and preventing said cellular phone from being reprogrammed with a different telephone number or a different service network until said password is obtained from said authorized personnel and entered through the keypad of the cellular phone.

22. The method for programming a cellular phone according to claim 21, wherein said step of generating a password comprises generating a password using a predetermined segment of an activated telephone number assigned to the cellular phone and scrambling the predetermined segment according to an algorithm.

23. A method for programming a cellular phone, comprising the steps of:

activating a cellular telephone on a cellular telephone service network by entering a code sequence into a keypad of the cellular telephone;

generating a password upon activation of said cellular telephone;

storing said password in a database accessible only by authorized personnel of said telephone service network;

storing said password in a nonvolatile memory in said cellular telephone; and preventing said cellular phone from being reprogrammed with a different telephone number or a different service network until said password is obtained from said authorized personnel and entered through the keypad of the cellular phone; and wherein said step of generating a password comprises generating first and second passwords upon activation of said cellular telephone, said method further comprising preventing said cellular phone from being reprogrammed with a new telephone number until said first password is entered through the keypad of the cellular phone and preventing said cellular phone from being reprogrammed for use with a different service network until said second password is entered through the keypad of the cellular phone.

24. The method for programming a cellular phone according to claim 23, further comprising generating said first and second passwords from first and second respective segments of an activated telephone number assigned to the cellular phone, and scrambling the respective first and second segments according to respective first and second algorithms.

25. The method for programming a cellular phone according to claim 24, wherein said activated telephone number comprises at least ten digits, said first respective segment comprising the first eight digits of said activated telephone number, and said second respective segment comprising the last eight digits of said activated telephone number.

* * * * *